United States Patent
Jenkin et al.

(10) Patent No.: US 7,151,929 B1
(45) Date of Patent: Dec. 19, 2006

(54) SATELLITE PAYLOAD DATA COMMUNICATIONS AND PROCESSING TECHNIQUES

(75) Inventors: Keith R. Jenkin, Seal Beach, CA (US); Roy K. Tsugawa, Lomita, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 1413 days.

(21) Appl. No.: 09/641,654

(22) Filed: Aug. 18, 2000

(51) Int. Cl.
*H04Q 7/20* (2006.01)

(52) U.S. Cl. .................... 455/430; 455/427; 455/12.1; 455/428

(58) Field of Classification Search ............... 455/12.1, 455/13.1, 13.2, 427, 430, 428, 8, 9, 507, 455/508, 98
See application file for complete search history.

(56) References Cited

U.S. PATENT DOCUMENTS

| | | | | |
|---|---|---|---|---|
| 5,455,961 A | * | 10/1995 | Nakagawa | 455/12.1 |
| 5,867,530 A | | 2/1999 | Jenkin | 375/259 |
| 5,878,034 A | * | 3/1999 | Hershey et al. | 370/321 |
| 5,914,942 A | * | 6/1999 | Hassan et al. | 370/316 |
| 5,924,014 A | * | 7/1999 | Vanden Heuvel et al. | 455/13.1 |
| 5,940,444 A | | 8/1999 | Jenkin et al. | 375/260 |
| 6,243,560 B1 | * | 6/2001 | Jenkin | 455/12.1 |
| 6,271,877 B1 | * | 8/2001 | LeCompte | 348/144 |
| 6,438,374 B1 | * | 8/2002 | Bhat | 455/423 |
| 6,643,788 B1 | * | 11/2003 | Butler et al. | 713/400 |
| 6,691,274 B1 | * | 2/2004 | Olds et al. | 714/752 |

* cited by examiner

*Primary Examiner*—Temica Beamer
*Assistant Examiner*—Joy Contee
(74) *Attorney, Agent, or Firm*—John A. Miller; Warn, Hoffmann, Miller & LaLone, P.C.

(57) ABSTRACT

A satellite communication system (10) includes a satellite (20) which receives first and second data from sources. Each satellite receives control data from a satellite control center (100). An earth processing center (PC) is arranged to process the data received from the satellites, and a wide band network (30) is arranged to transmit the data to the processing center. A receptor terminal (A) is arranged to receive the first data and to place the first data on the network (30) for transmission to the processing center (PC). A second receptor terminal (B) is arranged to receive the second data and to place the second data on the network (30) for transmission to the processing center (PC).

37 Claims, 5 Drawing Sheets

SATELLITE PAYLOAD DATA COMMUNICATIONS AND PROCESSING TECHNIQUES

BACKGROUND OF THE INVENTION

This invention relates to satellite communication systems, and more specifically relates to such systems in which satellite data is processed by an earth processing center.

Satellite communications are taking on increased importance as evidenced by the following patents issued in the name of one of the inventors of the present invention: U.S. Pat. No. 5,867,530, entitled "Method and Apparatus for Accommodating Signal Blockage in Satellite Mobile Radio Systems," issued in the name of Keith R. Jenkin, on Feb. 2, 1999 and U.S. Pat. No. 5,940,444, entitled "DARS PSF With No Data Rate Increase," issued in the name of Keith R. Jenkin and Stephen J. Toner on Aug. 17, 1999.

Prior satellite communication systems requiring earth processing centers including, for example, weather satellite systems. In such a system, one or more traditional ground stations are used. The weather satellite collects data continuously and saves it onboard, and then "dumps" that data as it over flies a traditional ground station. Polar locations are chosen as sites for traditional polar orbiting missions since the poles are overflown on every orbit, thus minimizing the number of traditional ground stations needed. (If the stations were located elsewhere, say near the equator, a prohibitively large number of these expensive facilities and sustaining staff ringing the globe would be needed to avoid blind orbits.)

Significant Data Timeliness Compromise

Mission data is continuously collected and stored onboard until a traditional ground station is encountered. This results in data already being delayed by up to as much as approximately 100 minutes before it even reaches the ground, which for weather data is highly undesirable.

Traditional Ground Station Complexity and Cost

Since there are very few downlink opportunities, and each of them is usually critical to prevent blind orbits, the stations must have extremely reliable communications with the satellite to avoid unacceptable performance. Usually a bi-directional system is used (both downlink and uplink) to first establish a valid link, then command the satellite to begin the downlink process. Data integrity can be checked in near real time on the ground, and handshaking schemes can instigate the retransmission of data packets in more sophisticated systems. A full time (24-7) crew is essential at traditional ground stations for rapid repairs if needed, and also man-in-the-loop scheduling conditions automated systems can't handle (i.e. preemption situations). In remote regions the continuous staffing required over many years becomes a major consideration in program life cycle cost. In a case like McMurdo (Antarctica) the environment is incredibly adverse, and logistics become a major concern. While adding the example McMurdo is attractive since the nominal maximum onboard storage time is reduced to half an orbit instead of one orbit, the programmatic impact is substantial.

Minimum Pass Limitation of Prior Systems

Since a downlink to a traditional ground station is a complex operation, a practical limit on the geometrically available contact time is usually imposed. The ground station antenna (which might service several other satellites too) needs to be slewed, signal acquisition accomplished, and reliable communications need to be established. Therefore, otherwise viable contacts at a traditional ground station are discarded if the contact opportunities are somewhat short, such as five minutes (of a nominal 12 minute pass time). The preferred embodiment of the present invention does not require a minimum pass limitation, since it is a dedicated, mission-captive capability. Furthermore, even "scraps" of mission data (small periods) are useful in the preferred embodiment architecture, since it will be shown that all received valid data, no matter how small or redundant, become amalgamated or used as checks upon arrival at the processing center.

Ground Communication Drawbacks of Prior Systems

Since the traditional ground stations are generally located in remote, sparsely populated areas, taking advantage of commercially financed, installed, and maintained fiber optic networks is unlikely since there is no financial motivation for servicing such geographic (polar) areas. This means communication from traditional ground stations to the processing center (probably in the U.S.) is expensive for the data rates (bandwidth) needed by future weather satellites. Either dedicated, sole-user fiber is needed, or perhaps a complex, risky, and expensive "hop" from the station to a communications satellite and back to the U.S. is needed. Or, a slow existing link might be used, but because of limited bandwidth, data will again be delayed awaiting its turn in a rate buffer queue for ground communication.

Frailty of Prior Systems

Since there are, practically speaking, several single point failure opportunities in a traditional ground station system, each point must have incredibly high (i.e. expensive) reliability and sufficient availability. For instance, if a key station is down for a prolonged period, say due to earthquake damage, or immediately irreparable equipment failure, or staffing problems and so on, critical data will be lost or arrive so late it's essentially useless.

Spacecraft Complexity/Risk of Prior Systems

Since passage over a traditional ground station is on the order of 10 minutes, and the stored data is from a nominal 100 minute orbit, high downlink data rates (a minimum of 10× payload data rate) need a spacecraft pointable, high gain antenna to keep spacecraft electrical power and transmitter needs reasonable. This means either moving mechanical parts (an articulated gimbal system), or possibly a phased array antenna (complex). Since the spacecraft antenna is highly directional (continuously dynamically pointed at the ground station) and since transmit power is limited, only one ground station at a time can be downlinked. Furthermore, if subsequent contact opportunities arise, a gimbaled spacecraft antenna needs precious time to slew and repoint.

Station Scheduling Complexity of Prior Systems

Since several satellites may need servicing by the same station, scheduling is complex amongst disparate systems to avoid usage conflicts. As more satellites are launched using the same stations, competition for use of the stations increases and scheduling becomes increasingly complex and conflicting. Adding additional antennas, electronics, and personnel at a traditional ground station facility can help mitigate this situation, but is expensive.

The present invention addresses the foregoing deficiencies of prior systems and provides a solution.

BRIEF SUMMARY OF THE INVENTION

The preferred embodiment is useful in a satellite communication system comprising at least a first satellite arranged to receive first data from a first source and second data from a second source displaced from the first source to receive control data and to transmit the first data and the second data to the earth. In such an environment, the first and second data may be processed by receiving the first and second data at the earth from the satellite. According to an apparatus embodiment, a first receptor terminal is arranged to receive the first data and a second receptor terminal is arranged to receive the second data. The first and second data are transmitted to a location adjacent the earth for processing. In the apparatus embodiment, the transmitting is achieved by a wide band network. The first data and second data are processed at the earth. In the apparatus embodiment, the processing is achieved by a processing center. By using the foregoing techniques, the first and second data may be processed with increased speed and at reduced cost.

DETAILED DESCRIPTION OF THE PREFERRED EMBODIMENTS

Figure 1:
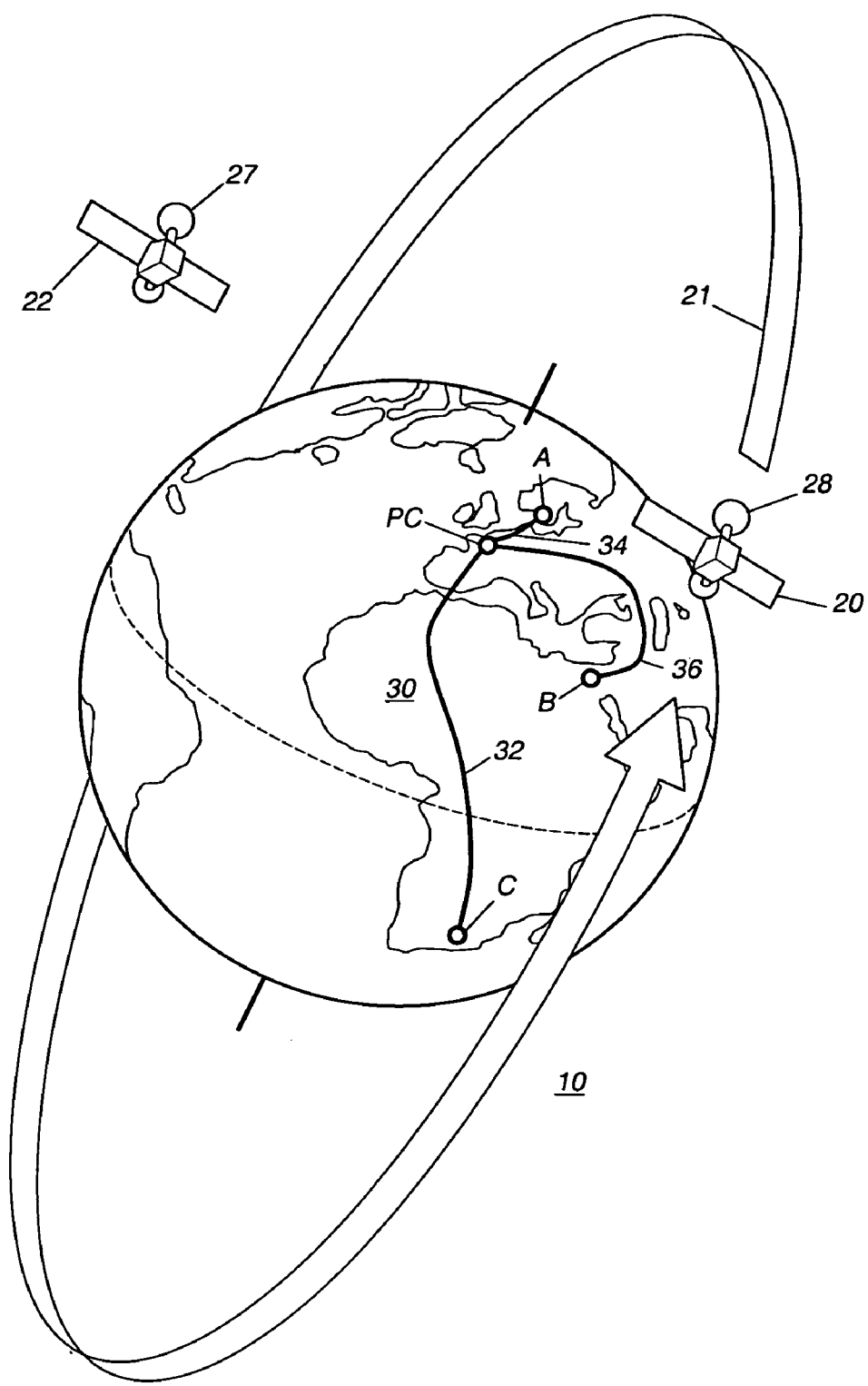
FIG. 1 is a schematic representation of a preferred form of communication system employing communication satellites and embodying the invention.

Glossary of Terms Used in this Specification

Autonomous Mode: An alternative embodiment where the system is completely autonomous, yet with coverage immunity to failures. Improvements and repairs still can be made on the ground only.

Traditional Ground Stations: In the context of this specification, this refers to large, complex, expensive, facilities used for many years in the past to support communications with various satellite systems.

Receptor: The preferred embodiment may use, for example, a distributed network of small extremely simple, and relatively inexpensive, unmanned antenna/receivers that are receive-only. (Downlink signal reception, but no uplink signals sent to the satellite(s)). These are technically earth stations, but of a significantly reduced complexity/cost class than the Traditional Ground Stations noted above.

Checksum: This is one of several mathematical means of verifying the integrity of a block of digital data, of varying potency. For simplicity in describing the preferred embodiment, checksum will be referred to, but any of the several other, possibly more complex and robust methods may be used for a specific application. A checksum is simply the sum of all values in a known-size dataset. If a subsequent checksum is done on the same dataset at a later time (say, after communication transmission) and its checksum value isn't precisely the same as the original checksum for the same dataset, errors in the dataset are present. Checksum does not allow correction of errors, but merely is a test (only) for data integrity. The important point is that the amount of bits needed for a checksum value (or other integrity-test-only method) is extremely small compared to the amount of bits in the dataset itself.

Virtual Spherical Coverage: A feature whereby the whole earth can be mapped in a timely and confident (high data integrity) manner, despite having intermittent communication contact (satellite-to-ground downlinking) of less than four PI steradians (spherical coverage).

Mission Data: The actual useful information from a satellite, such as imagery produced from mission instruments, plus any overhead needed such as headers and encryption. (Other data from a satellite typically includes things such as satellite housekeeping information, which is typically very low data rate in comparison to the actual end-use mission data.)

Data Timeliness: The time from when data was collected, to when it becomes useful to the end-user. In systems such as the example mission cited below when configured as a legacy system using traditional ground stations, the dominant timeliness constituent is the delay between downlink contacts from the physical constraints of orbit and ground station geometries. Also referred to as data aging or data latency.

Preemption: For one of several possible reasons, a geometrically possible communication opportunity (satellite is within nominal communication range and adequate other conditions) is not utilized for downlinking mission data. Examples of preemption include: 1) ground station is preoccupied servicing another satellite having higher communication priority, 2) a ground station is down (inoperable) due to scheduled maintenance or unscheduled failure of its own equipment or its communication to the final data delivery point (e.g. ground communication to the U.S.), 3) ground station staff insufficient, 4) severe weather at a ground station (e.g. extreme wind requiring antennas to be caged), 5) RF interference avoidance with another component.

Bind Orbit: An orbit where a satellite has had no opportunity to pass (downlink) Mission Data because of either a geometrically impossible situation (no ground stations within communication range on that orbit), or all communication opportunities were preempted. This is a very undesirable situation for missions where data timeliness is important, since onboard stored mission data will include an additional whole orbit's worth of delay by the time it is finally downloaded.

LEO, MEO and GEO: Grouping general classes of Earth orbiting satellites by their gross altitude.

LEO: Low Earth Orbit (in the hundreds of kilometers altitude range).

MEO: Medium Earth Orbit (in the thousands of kilometers altitude range).

GEO: Geosynchronous Earth Orbit (an altitude of around 36,000 kilometers, if circular, resulting in the satellite having an orbital period the same as Earth's rotation (one day), causing it to appear stationary overhead to an observer at a fixed location on Earth).

Sun-Synchronous-Polar-Orbit: At certain circular orbit altitudes and associated inclinations (e.g. around 800 Km and a few degrees of inclination) a satellite's orbit plane follows the Sun-Earth annual cyclic vector angular motion in inertial space. Such an orbit is advantageous to missions, such as the weather satellite mission. This orbit results in the entire Earth being mapped in a relatively short time at desirable constant sun illumination angles, owing to the combined dynamic geometry of the Earth's daily rotation, plus orbital motion, plus the cross-track swath of the satellite sensor's field-of-view. For global weather observation from relatively low altitudes (e.g. LEO versus GEO), this is an ideal scenario: full spherical coverage from consistent observation angles updated fairly frequently.

Solid State Recorder (SSR): Recently satellites have been implementing onboard data storage with solid state recorders, in lieu of earlier data storage implementations such as mechanical tape recorders. SSRs are essentially large amounts of RAM (as in a computer) plus some controlling circuitry. Obviously the elimination of moving parts (which eventually wear out and are prone to failure) is a reliability advantage. More importantly for system 10 is the random addressing capability (the "R" in RAM), programmability, and asynchronous operation, as will be shown.

Code and Coding: Two disparate uses: 1) Code referring to computer program instructions, and 2) Coding referring to data overhead for error detection/correction algorithms.

Satellite Operations Center: Usually a single facility for controlling satellites. Here commands are sent to the satellite to specify its operation.

Processing Center: Where mission data arrives to be converted to useful information for the intended end use. For instance, in connection with the preferred embodiment, weather maps are produced by analyzing (via computer) multi-spectral imagery data collected by the satellite with algorithms that can convert that raw data to a useful end product format.

The preferred embodiment is useful for many possible satellite/system configurations of varying characteristics and missions. However, the preferred will be described for purposes of illustration, but not of limitation, in connection with an LEO circular Sun-Synchronous-Polar-Orbit weather mapping satellite system. For this example, timely global mapping is important to mission objectives. (Weather data is highly perishable, since weather conditions are highly dynamic.) Such a weather satellite system may have several sensors (data collection instruments), spanning a large range of the electromagnetic spectrum in observation of weather-related phenomenology below the satellite. Such sensors typically produce a steady stream of mission data, typically of high density (high data rates, such as that needed for multi-spectral imaging).

Referring to FIG. 1, the preferred embodiment includes a satellite communication system 10 comprising a weather satellite 20 circling the earth E in an LEO 21. Another identical weather satellite 22 circles the earth E in another LEO (not shown). System 10 also includes a processing center PC and receptor terminals A, B and C which are linked to center PC by a wide band optical fiber network 30, including links 32, 34 and 36.

The satellites 20 and 22 of the preferred embodiment have an orbital period of about 100 minutes (about an hour and a half per orbit), and have a Mission Data rate of about 20 Mbps, a continuous stream of the amalgam of all sensor data (megabits per second). The data stream may consist of raw data, or compressed data of either the lossy or non-lossy variety. The data stream also includes any overhead information as noted, including data encryption details. For simplicity, this example assumes that the Mission Data is always at a fixed, constant rate coming from the mission sensors, which is adequate for illustration. An actual system may have a variable rate in practice, for efficiency (compression), or scene-content variation (e.g. some sensors may not function at nighttime) or other reasons.

Global Fiber Optics Ground Communication Network 30

A wide band network, such as network 30, is known to those skilled in communications. There are many references in the open literature describing the present and future status of wide band networks, such as fiber optic cables. All of the significantly populated continents are encircled in fiber optics cable, such as cables 32, 34 and 36 that can pass a minimum of 40 Gigabits per second. In the next couple of years, the entire globe (with the exception of arctic Polar Regions having nil population and commerce) will be a "spider web" of multi-terabit fiber optic cable. This is due to fiber optics technology where many optical spectral bands are used in a single fiber strand to produce nearly a two order of magnitude increase in communication data rates. The preferred embodiment uses this extremely fast and inexpensive communication from it's receptors, such as A, B and C, located most anywhere on earth, back to the Processing Center, PC. The bandwidth proportion needed by a weather satellite system, such as the one shown in FIG. 1, is on the order of one-one-hundred-thousandth of the capability of a terabit optical fiber, which is essentially epsilon and therefore very inexpensive. The preferred embodiments also may be used for applications other than a weather satellite system, such as television, HDTV, Internet, telephone (including video soon), videoconferencing, and financial data communications. Thus, the preferred embodiments take advantage of this global inexpensive communications capability financed by commercial/consumer markets, instead of the traditional method of utilizing mission-dedicated ground communication means.

SSR Programmability and Flexibility

Figure 2:
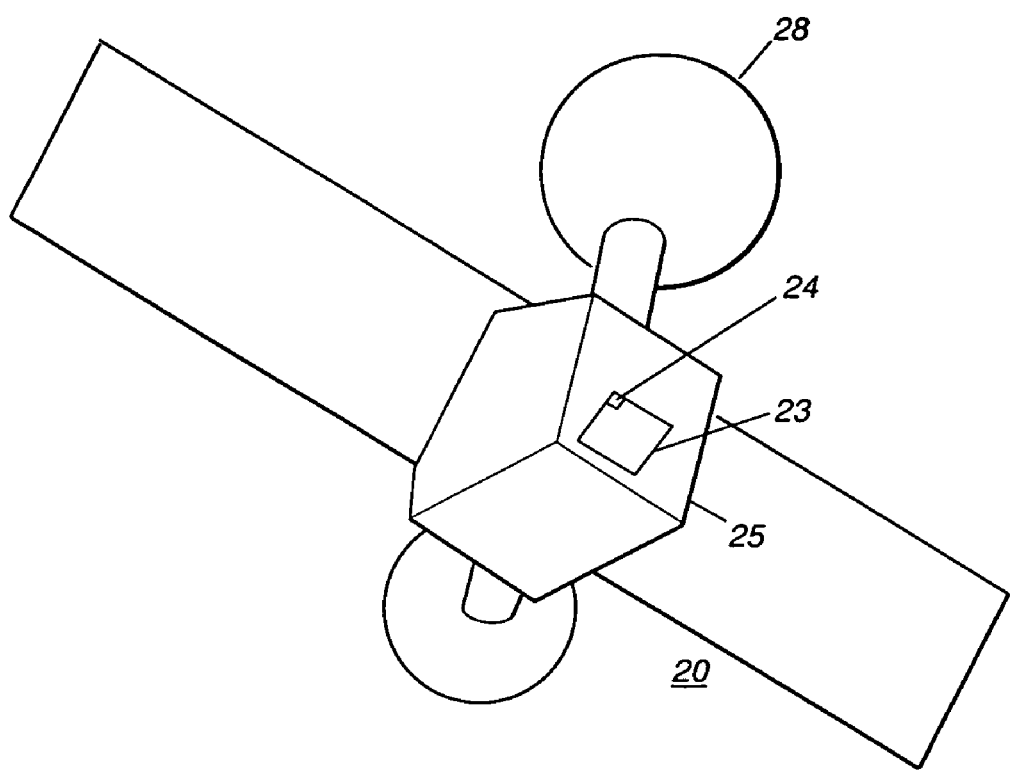
FIG. 2 is an enlarged view of one of the satellites shown in FIG. 1.

Referring to FIG. 2, satellite 20 includes an on-board processor 23, which stores mission data in an SSR 24 that may take the form of a recirculating memory. In the past, satellite data storage methods such as mechanical tape recorders would operate in a mode of continuous recording while out of ground station contact, then high rate playback during a downlink pass, in a fairly rigid sequential modality. SSR 24, on the other hand, can be treated like RAM in computer 23: access to all memory data at any time and in any order is possible, both for recording (writing), and non-destructive and highly selective playback (reads). The preferred embodiment uses these SSR features of random access and non-destructive reading in several ways.

Figure 3:
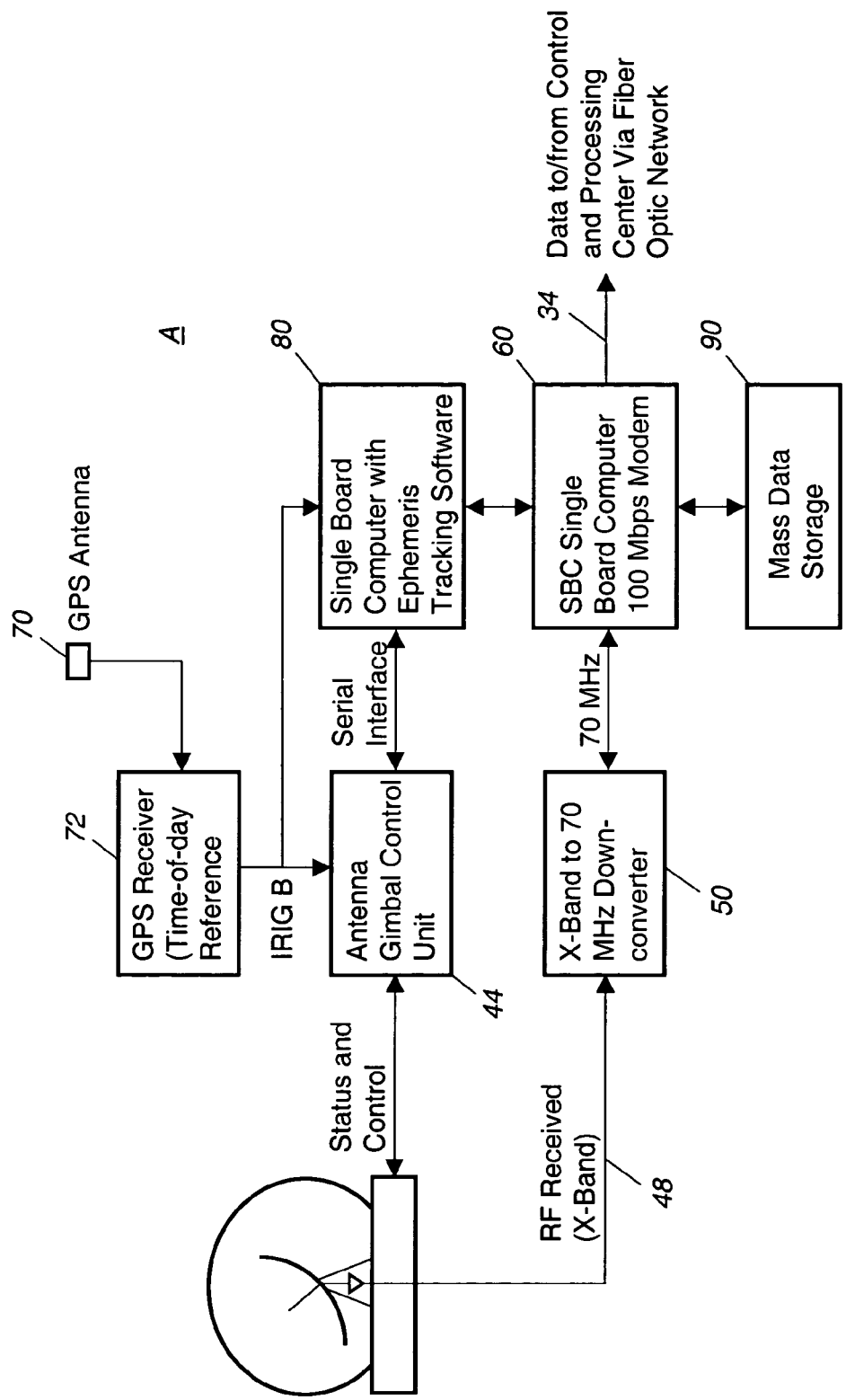
FIG. 3 is a schematic block diagram of a preferred form of receptor terminal made in accordance with the invention.

The preferred embodiment uses globally distributed simple and inexpensive "receptors" A, B and C. These preferably are small, unmanned antenna installations located at easy access points to the global fiber optic network. Referring to FIG. 3, exemplary receptor terminal A includes a small dish antenna 40 approximately two to four meters in diameter, an antenna pointing gimbal control unit 44 (e.g. servos and encoders), an appropriate antenna feed 48, a receiver/demodulator 50 which downconverts the carrier signal received from one of satellites 20 or 22, and interfacing electronics 60 to the commercial fiber optics network link 34. A phased array antenna could also be used.

Receptor terminal A receives the open-loop broadcast signal from an over flying satellite, collects the RF signal the satellite is transmitting, demodulates the signal to a digital format, adds simple periodic "wrap" tagging headers of time and location and synchronization bit patterns around an arbitrarily sized "macro packet," and forwards the raw bit stream via commercial optical fiber link 34 to the processing center PC. There are no complex data operations at the receptor, it merely acts as a bridge from the satellite broadcasts to the processing center. No data analysis or assessment or decisions are made, nor are any processing operations done by the receptors. They simply collect data and pass it along. Since the receptors are very simple and small and located on existing fiber communications channels, their deployment and operation is very cost effective.

It will be shown that a modest number of receptors is needed to implement the preferred embodiment because the preferred embodiment employs virtual spherical coverage which mitigates the fact that several gaps exist in true geometric coverage opportunities. In the preferred embodiment, 12 receptors are used to achieve reasonable coverage. Depending on the needs of the system, at least twice that many receptors may be deployed.

Still referring to FIG. 3, receptor terminal A also includes a GPS antenna 70 and a GPS receiver 72 which can, for example, receive the time of day. A computer with ephemeris tracking software 80 controls gimbal control unit 44 in a well known manner. A mass data storage unit 90 stores mission data in case of problems.

Figure 4:
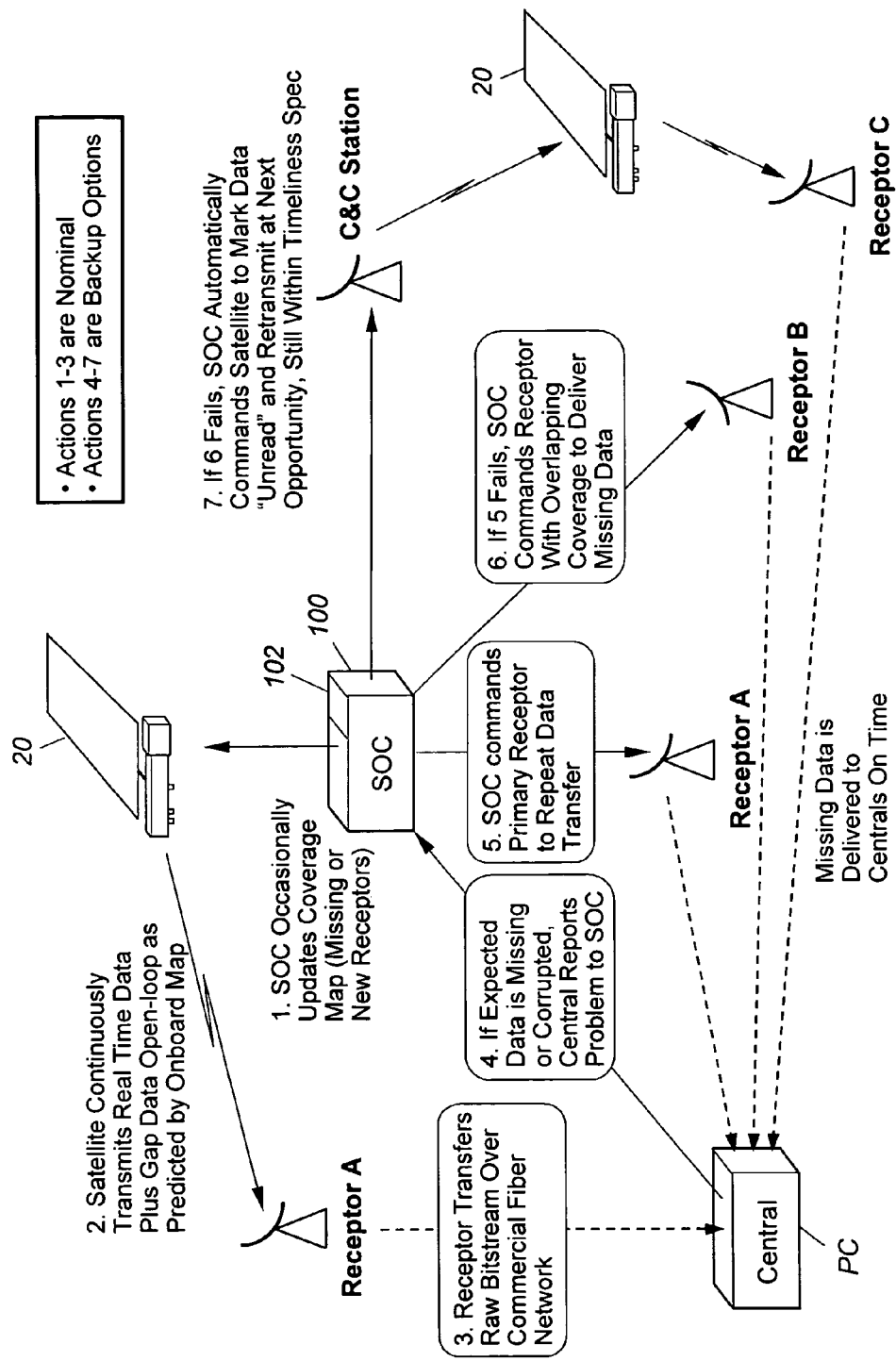
FIG. 4 is a schematic block diagram illustrating a preferred form of data recovery in the event of an anomaly in the system shown in FIG. 1.

Referring to FIG. 4, system 10 includes a satellite or mission operations center 100 comprising an adaptive logic controller 102 which automatically and transparently adapts system 10 to any dynamic operational scenario without compromising data quality or incurring data loss. Controller 102 provides receptor failure mitigation, and automatic system acclimation/adoption of new receptors added to the system. In a sense, the system 10 "learns" as it operates, and continuously, and independently adapts to system configuration changes. In other words, system 10 provides a practical virtual spherical coverage system with data integrity and minimal, if any, data loss. System 10 also provides near real time data collection to data delivery time, a robust and forgiving mode of operation, a life cycle cost advantage, easy growth and expandability. System 10 also provides nearly continuous downlink coverage for LEO and MEO satellites.

Referring again to FIGS. 1 and 2, satellites 20 and 22 comprise conventional LEO satellites consisting of the usual, normal subsystems for providing power, attitude control, orbit maintenance, a benign thermal environment, and command/status communication, etc. The satellites also include sensors 27 and 28 for gathering weather data.

The satellite mission data collection subsystem for satellite 20 comprises medium data rate (say 4× sensor data rate) data downlink equipment 25 including programmable SSR 24 (random access), conventional data multiplexing, coding, and encryption functions, and a fixed, wide field of coverage broadcast antenna.

The function of this medium data rate satellite downlink communicating subsystem is to transmit mission data continuously, and to store it for short periods during communication gaps and transmit it along with real time mission data at the next receptor encounter. This broadcasting on cue is metered by periodically updated, preloaded commands and a frequently updated onboard stored digital contact zone reference map.

Referring still to FIG. 1, system 10 includes simple low cost, modest reliability, unmanned receive-only terminals A–C located at generally equally globally distributed convenient sites. The receptors are in reasonable proximity to the worldwide network of fiber optic communication channels 32, 34 and 36 for fast and cheap passage of received mission data to a common mission Processing Center PC. The receptors can, for example, be mounted on the rooftops of existing facilities, including government embassies (U.S. and or friendly countries), commercial global communications provider's facilities (e.g. MCI or AT&T), military installations, suitable traditional ground station sites, or any of several global satellite command and control facilities. Anywhere cheap fiber optics communication is available. Note that if a location critically needs a receptor for ultimate mission data timeliness in that locale but fiber communication isn't within practical reach, a "bounce" to a convenient comsat could be set up with existing available equipment, or perhaps a microwave or coaxial cable, or a conventional communications link (e.g. T1) to the closest fiber optic network interface. A receptor could be installed on military or commercial ships having adequate communication links, with five-space motion backed out of pointing commands.

Still referring to FIG. 1, system 10 includes a traditional satellite operation center 100 for sending operating commands to satellites 20 and 22. In system 10, center 100 is identical to a traditional command center and operation, except that SSR and medium data rate transmission commands and onboard maps are included in the command stream, which are prepared from system health information gleaned from mission data reception at the processing center PC.

Referring to FIG. 1, the PC provides a facility where all mission data from the satellite(s) arrives to be analyzed and formatted for end use by specialized science-based algorithms, a common function of weather systems. At the PC, data integrity is continuously tested ("checksums" and/or one-on-one redundant data duplicates compared from circuitous routes) and any necessary system reconfiguration commands forwarded to the satellite 20 and 22. Note that these are very low data rate and occasional commands that can be sent through a variety of existing channels, such as SOC 100, a data transmission satellite (e.g. TDRS), a traditional ground station, or any of many distributed satellite command facilities. Note that the processing center PC and operations center 100 may reside in one and the same physical (shared) facility, in a convenient location such as a city in the continental U.S.

Referring to FIG. 1, Mission Data collection is achieved in a conventional manner by satellites 20 and 22. Sensors 27 and 28 continuously observe the Earth and its atmosphere producing a continuous stream of data. Onboard electronics then condition the data, multiplexing various data sources, compressing, encrypting, and other common data formatting operations. As noted above, the data rate for convenient illustration here is assumed at a constant rate, but could also be variable.)

In satellite 20, data is routed to two destinations: the first to the SSR 24 (FIG. 2) for continuous onboard storage, and the second to a multiplexer at the medium data rate broadcast downlink transmitter. At the multiplexer it is always continually broadcast in real time as data is collected. At the SSR destination it is also always continuously stored Incrementally in time (sequence).

SSR 24 (FIG. 2) can be configured as a "ring buffer." This is a logical memory arrangement where data is continuously written at the "head" pointer as it continuously advances around the (virtual) "ring." The size of the ring is such that several orbits of mission data are stored at any time (e.g. five orbits). As the head pointer advances, it will eventually catch the "tail" pointer and begin overwriting the data that is (in this example) five orbits old. At any instant, all data from a time exactly five orbits worth prior is stored, and instantly randomly accessible.

In the satellite 20 ring buffer implementation, data is never released, but only gets finally overwritten as the head chases the tail of five orbits prior. Thus, data is always available for delayed transmission (when a contact gap exists) or when data that was assumed successfully received is not, as reported/requested in later (asynchronous) uplink commands/reception status from the operations center, and retransmission of poor quality (noisy) or missing data is needed.

So, system 10 asserts that its anticipated transmissions to expected active contacts will be successfully received by receptors, such as A–C, and forwards the transmissions to processing center PC, open loop, according to its onboard contact availability map. When a gap in coverage is indicated by the map, that data (being continuously stored in the ring buffer 24) is marked for later transmittal, is retrieved from the SSR 24 and is multiplexed along with the continuously transmitted real time data. The system 10 is anticipatory: it downlinks saved gap data when the satellite is confident it will successfully be received. (If that fails, the data will still be retrieved at the next opportunity once the missing data is reported.)

Referring to FIG. 4, if for some reason a segment of that open loop data never makes it successfully to the processing center PC when anticipated, it can be requested for retransmission (automatically) by the SOC 100 logic, Such a request would occur, for example, if a receptor was physically damaged in a storm, or lost its source of electrical power. The coverage map is then updated for future use with that receptor removed and uplinked at the next opportunity to the satellite to correct its future contact profile assertions. (The center 100 has the same coverage map and knows when data should arrive.) Note that even though the system 10 is nominally a very simple open loop arrangement, it can retrieve missing or noisy data segments well within a reasonable delay time.

A traditional system, always has forced substantial delay since contact opportunities are widely spaced. If a traditional expected ground station contact is missed, serious excess latency results, rendering the data essentially useless for dynamic weather use. Thus, a traditional system critically needs and relies on every one of its infrequent downlink opportunities, whereas the system 10 recovers quickly and is immune to data tardiness if a receptor pass is missed.

Another embodiment ("Autonomous") is possible. For some applications, the alternative may be a potential additional but possibly acceptable burden on downlink channel use. It is akin to the patents referenced in the background section. The satellite would continuously broadcast time-shifted data copies from earlier periods in its orbit, in a post facto fashion. For example, if, say, four layers of time shifted data were continually broadcast assertively (open loop) to receptors having typically a ten minute pass, about a quarter of an orbit's prior data could be received automatically by a single receptor in that vicinity. As is described in the reference patents, a similar technique for increased downlink and ground communications would be to reduce the quality (lossy compression) or to partially select critical data sections, and thus reduce the data rate of the redundantly transmitted layers. Data would still get to the destination in a timely and complete manner, but with a slightly reduced fidelity. This totally open loop, virtual spherical coverage mode could be a backup, tail safe modality. If the satellite is for any of several reasons not receiving a normal uplink command profile, the satellite could automatically default and reconfigure to this totally autonomous mode. This would still provide full Earth coverage, even if receptors randomly fail. In other words, the system is completely automated, and any repairs needed for continuous coverage are made on the ground (e.g., repairing inoperable receptors or supplementing them with nearby additional receptors).

In the case of noisy data receipt, for perhaps a temporary reason such as a severe local storm at a receptor (e.g. "rain fade"), then the coverage map will still get updated as a precaution for further use, and that noisy data gets subsequently recovered, since the system 10 also gracefully and automatically recovers from both a temporary compromise in a receptor's performance, as well as from prolonged permanent outages. Note that noisy data (beyond correction capabilities) can be short term ("bursty") in system 10, and the whole pass over a receptor is mostly valid and saved, and only the noisy parts recouped as needed.

System 10 automatically recognizes and adjusts the coverage map when a new receptor is brought on line. There is no need to tell the system it has been added and to look for it. Also note that receptor deployment and installation is remarkably easy: a contracted local technician simply unpacks the unit (in maybe two or three convenient pieces), secures the receptor stanchion in approximately the appropriate North/South orientation (via a magnetic compass or handheld GPS unit), and squares it vertically with a bubble level. Once power is provided and network communication (fiber optics connection) is established by conventional commercial methods, installation is complete. This crude initial orientation is adequate, since the receptor is initially commanded in a simple search pattern remotely from the operations center, pointing the receptor antenna generally in the direction at the right time when a known system 10 satellite will over fly. Since the system 10 satellites are continuously transmitting real time data, no coordination or cooperation is necessary. The processing center PC will suddenly start receiving valid data from the new receptor and adjust the common coverage map accordingly. Any receptor misalignment is dialed in as a bias to its future pointing commands from the operations center. Since the satellite (instant) location is very accurately known from its orbital elements, and the location of a receptor is also accurately known and fixed (via a onetime GPS handheld measurement), the precise pointing locii for all satellite/receptor dynamic combinations is easily and accurately calculated. There is no need for constant "hunting" and handshaking for acquisition. The receptor is simply told where and when to point, and passes along whatever it receives.

At least three means of insuring data integrity (successful and complete data receipt) are available and implemented in system 10:

(1) Traditional error detection/correction overhead bits embedded in the data stream right on the satellite. (The usual digital communications procedure).

(2) By comparing a delayed (time-shifted) "checksum" (etc.) stream of each original data packet (embedded in the downlink stream, before receptor receipt and passage to the processing center) with a checksum calculated for packets as they arrive at the processing center. According to the preferred embodiment, every so often, the checksums of all previous packets collected in an orbit are sent as a burst along with the real time mission data. (This is a trivial impact on overall transmitted data rate, thus costing nothing in bandwidth.) So, when the processing center PC receives mission data, it also gets the checksums of all data sent for 100 minutes prior to that time. These delayed spacecraft-calculated checksums can be compared to checksums calculated again by the PC on the same data received after transmission. If there is a difference, then the suspect data can be requested for retransmission via the next command opportunity, since it is still resident and intact in the satellite SSR 24. This alleviates a remote but possible situation, of particular concern for military uses, of weather data tampering. Imagine someone clever enough to intercept and alter data en route from a receptor to the processing center. (Practically speaking an essentially impossible, yet remotely conceivable task, since the data is probably compressed, encrypted, and laced with several layers of data quality tests and error correction means.) So, if the seemingly impossible tampering were successfully accomplished, say, to make it look like rain in Spain when in fact it is a sunny day, the act would be detected within minutes. (The next receptor downlink checksums wouldn't match). Future reception from a tampered receptor's data would of course be suspect, and disregarded until the problem has been removed.

Duplicate receipt of identical packets can occur if the contact patterns of two or more receptors overlap, which is a likely situation. Thus, the processing center PC can receive duplicate data from circuitous routes and physical locations. These can be compared one-bit-for-one-bit exactly after error correction and normal goodness tests have been passed, and if there is a difference, something is suspect. (The system 10 can always tell multiple receptors overlapping in coverage to selectively not transmit those zones to save fiber communications costs and overly redundant data retrieval.)

(3) System 10 also provides for satellite command intrusion immunity. A valid concern is the potential of a renegade individual or group sending unauthorized commands to a spacecraft for whatever reason. As such, traditional ground stations are highly secured to alleviate the possibility of intrusion. The system 10, however, (preferably is a downlink-only system. It is impossible to tamper with a receptor and send erroneous commands to a satellite, since there is no physical mechanism (transmitter and associated feed and logic and modulation electronics). Thus, the concern of locating receptors in questionable areas is not of concern for sending false commands to the satellite(s).

Satellite weather systems frequently calibrate their sensors and data with ground truth. (In situ actual measurements using ground based instruments, or weather stations.) This data is, of course, available from many sources. However, it would be very easy to mount measurement instruments on each receptor, perhaps on the receptor stanchion directly. Local weather data could be passed to the operations center, on low bandwidth communication means, continuously. Such weather information, in addition to providing a controlled source of ground truth for the system, could also be helpful in remotely assessing a data error condition. For example, if rain fade is the cause of noisy data (and not, say, RF interference, etc.), then a local weather report directly from the receptor would be useful. The weather instruments could be rudimentary (temperature, wind conditions, humidity and others), or more complex such as automatic cloud cover assessment devices. A simple video camera and microphone at the receptor could also be handy for remote receptor health assessment.

A significant cost savings and simplification of the processing center ("PC") occurs when system 10 is used instead of a traditional ground station architecture. In a traditional system, data arrives at the processing center in bursts, as spacecraft in the constellation rapidly downlink to a station data collected during one orbit of the spacecraft around the earth. There are long quiet periods at the PC when the spacecraft are away from station coverage for prolonged stretches. Since these PC abrupt ingest bursts can be from any one of the spacecraft in a constellation, an obvious approach is to share the PC computing capacity among the various spacecraft for computing resource efficiency. However, there is substantial complexity and development cost associated with managing one large computer resource to service several different spacecraft simultaneously and asynchronously. In System 10, however, data arrives at the PC from all spacecraft more or less continuously, with the exception of brief receptor coverage gap zones. This makes practical a PC architecture where each spacecraft and its payload have their own, dedicated processing hardware and software, since there is no advantage to sharing computer resources. This then allows 1) Simple system growth (just add another computer when a new spacecraft is launched, and test/debug the new system without perturbing the existing system), 2) Easily accommodated differences in spacecraft sensor payload suites (its own computer/software services its own unique payload), 3) Simple failure mitigation (a patch specific to a particular sensor flaw is specific to its own unique and dedicated computer), 4) A new spacecraft and its new computer can utilize the latest in computer hardware instead of forced use of dated equipment, 5) Software improvements can be done and tested on a spare parallel computer without disturbing the working system, and 6) Global computer failures are isolated to a single spacecraft/payload.

Figure 5:
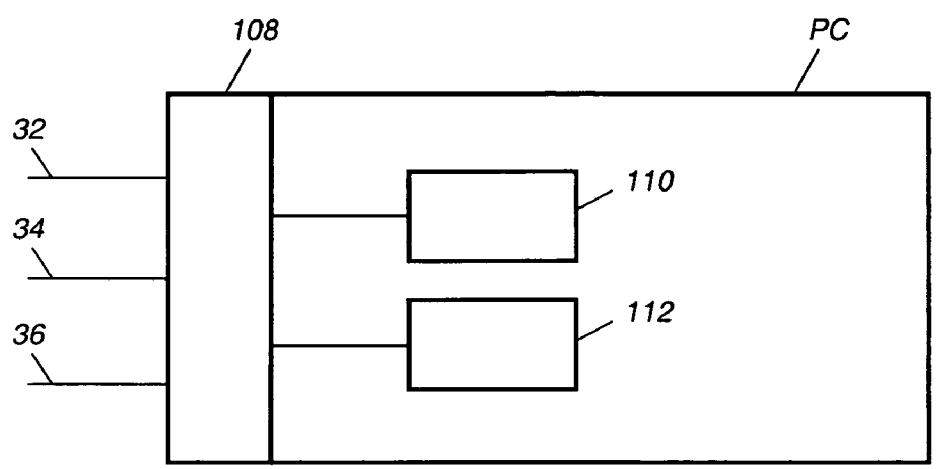
FIG. 5 is a schematic block diagram of a portion of a preferred form of processing center employing a plurality of computers.

Referring to FIG. 5, a processing center (PC) having the foregoing advantages may comprise two separate processors 110 and 112 which use the same type of hardware. They have identical but separate operating systems, and they execute different algorithms required for the processing of signals from different satellites. Processor 110 is dedicated to processing mission data received from satellite 20, whereas processor 112 is dedicated to processing mission data received from satellite 22. The data from the satellites is switched to the proper processor by a controller 108. By using this technique, processors may be lower capacity and lower cost than providing a single high speed processor to process data for both satellite 20 and satellite 22. In addition, each processor may be programmed to handle any algorithms which are unique to the type of data being processed from a particular satellite. When a new satellite comes on line, a new processor is added and may be programmed to handle the data from the new satellite. Since satellite systems advance rapidly in capability, this technique ensures that the processing center will not become obsolete when a new satellite begins to feed data to the processing center. The existing satellites and their respective computers may continue to function. The new satellite can be brought on line by merely programming a new computer to handle its needs while the existing computers continue to function as in the past.

In summary, the preferred embodiment offers at least the following advantages over the known traditional systems:

1) Near-zero final weather product timeliness: continuous data from all satellites instead of bursts of large amounts of widely separated (in time) data bunches;

2) Robustness;

3) Growth and redundancy;

4) No orbital phasing control required; any initial phasing, any orbit drift is accommodated 5) Downlink bandwidth can be in the tens of Mbps;

6) "Preemption" concerns disappear; planned, random, pronounced, or permanent;

7) Unmanned (no human errors, training, housing, management);

8) Security issues and concerns eliminated or more easily controlled;

9) Life-Cycle-Cost reduction; more economical overall (inexpensive terminals, no staffing);

10) Spacecraft simplified, more reliable (no gimbaled antenna: fixed/shaped beam);

11) Can be an independent adjunct to "Traditional" ground stations (enhancement, backup);

12) No need to artificially crop physical contact opportunities (no minimum pass time imposed);

13) No S/C-to-Ground Station coordination, cooperation, scheduling (mostly gone);

14) Mix and match orbits (e.g. different missions, different altitudes/periods) (no competition for station time);

15) Potential external funding since the system could be utilized by other future satellite systems;

16) No concern about simultaneous downloads to same terminal (physically impossible);

17) Simple deployment and installation;

18) An excellent approach to system autonomy (Autonomous Mode).

Those skilled in the art will recognize that only the preferred embodiments of the invention have been described in this specification. These embodiments may be modified and altered without departing from the true spirit and scope of the invention as defined in the accompanying claims.

What is claimed is:

1. In a satellite communication system comprising at least a first satellite arranged to receive first data from a first source and second data from a second source displaced from the first source, to receive control data and to transmit the first data and the second data, apparatus for processing the first and second data comprising in combination:
    an earth processing center arranged to process the first data and second data;
    a wide band terrestrial network arranged to transmit the first and second data to the processing center;
    a first receptor terminal arranged to receive the first data from the satellite and to place the first data on the network for transmission to the processing center; and
    a second receptor terminal arranged to receive at least the second data from the satellite and to place at least the second data on the network for transmission to the processing center.

2. Apparatus, as claimed in claim 1, wherein the satellite comprises a memory for storing the first and second data to provide multiple opportunities for data delivery.

3. Apparatus, as claimed in claim 1, wherein the first data is received by the satellite at a first time and the second data is received by the satellite at a second time later than the first time.

4. Apparatus, as claimed in claim 3, wherein the satellite transmits the first data at a third time occurring after the first time and wherein the satellite transmits the second data at a fourth time occurring after the second time.

5. Apparatus, as claimed in claim 1, wherein the satellite transmits the first data to the first receptor terminal in the event the first receptor terminal is prepared and positioned to receive the first data and wherein the satellite transmits the second data to the second receptor terminal in the event the second receptor terminal is prepared and positioned to receive the second data.

6. Apparatus, as claimed in claim 1, wherein the satellite transmits the first data and second data to the second receptor in the event the first receptor terminal is unprepared to receive the first data and the second receptor terminal is prepared to receive the first data and second data.

7. Apparatus, as claimed in claim 1, wherein the second receptor terminal is arranged to receive the first data and to place the first data on the network for transmission to the processing center in the event the first data is not received by the first receptor terminal.

8. Apparatus, as claimed in claim 1, wherein the satellite comprises a sensor arranged to receive the first data and second data.

9. Apparatus, as claimed in claim 1, wherein the system comprises a satellite operation center connected to the first receptor terminal and second receptor terminal by the network, the satellite operation center being arranged to transmit the control data to the satellite.

10. Apparatus, as claimed in claim 9, wherein the satellite operation center is arranged to signal the satellite to retransmit the first data to the first receptor terminal in the event that the processing center detects a deficiency in the first data.

11. Apparatus, as claimed in claim 9, wherein the satellite operation center is arranged to signal the satellite to retransmit the first data to the second receptor terminal in the event that the processing center detects a deficiency in the first data and the satellite is out of range of the first receptor terminal.

12. Apparatus, as claimed in claim 1, wherein the system comprises a second satellite arranged to receive third data from a third source and fourth data from a fourth source displaced from the third source, to receive control data and to transmit the third data and the fourth data, wherein the system comprises at least a third receptor terminal arranged to receive the third and fourth data and to place the third and fourth data on the network for transmission to the processing center and wherein the processing center comprises a first computer arranged to process the first and second data and a second computer arranged to process the third and fourth data.

13. Apparatus, as claimed in claim 1, wherein the network comprises an optical network.

14. In a satellite communication system comprising at least a first satellite arranged to receive first data from a first source and second data from a second source displaced from the first source, to receive control data and to transmit the first data and the second data to the earth, a method of processing the first and second data comprising in combination:
    receiving the first data at the earth from the satellite;
    transmitting the first data over a wide band network to a terrestrial processing center;
    receiving at least the second data at the earth from the satellite;
    transmitting at least the second data over the wide band network to the terrestrial processing center; and
    processing the first data and second data in the terrestrial processing center.

15. A method, as claimed in claim 14, and further comprising storing the first and second data on the satellite, to provide multiple opportunities for data delivery.

16. A method, as claimed in claim 14, and further comprising receiving the first data at the satellite at a first time and receiving the second data at the satellite at a second time later than the first time.

17. A method, as claimed in claim 16, and further comprising transmitting the first data from the satellite at a third time occurring after the first time and transmitting the second data from the satellite at a fourth time occurring after the second time.

18. A method, as claimed in claim 14, and further comprising transmitting the first data from the satellite to a first location on the earth in the event the first location is prepared and positioned to receive the first data and transmitting the second data from the satellite to a second location on the earth in the event the second location is prepared and positioned to receive the second data.

19. A method, as claimed in claim 14, and further comprising transmitting the first data and second data to a second location on the earth in the event that a first location on the earth is unprepared to receive the first data and the second location is prepared to receive the first data and second data.

20. A method, as claimed in claim 14, and further comprising signaling the satellite to retransmit the first data to a first location on the earth in the event that the processing step detects a deficiency in the first data.

21. A method, as claimed in claim 20, and further comprising signaling the satellite to retransmit the first data to a second location on the earth in the event that the processing step detects a deficiency in the first data and the satellite is out of range of the first location.

22. A method, as claimed in claim 14, wherein the system comprises a second satellite arranged to receive third data from a third source and fourth data from a fourth source displaced from the third source, to receive control data and to transmit the third data and the fourth data to the earth, and wherein the method further comprises receiving the third and fourth data, wide band transmitting the third and fourth data for to the terrestrial processing center, and wherein the processing step comprises processing the first and second data with a first operating system and processing the third and fourth data with a second operating system.

23. A method, as claimed in claim 14, wherein each of the transmitting steps comprises optical transmitting.

24. A satellite data collection and distribution system, comprising:
   at least one earth-orbiting satellite having at least one data collection instrument, a memory for storing collected data and a transmitter for broadcasting the collected data toward the earth on a substantially continuous basis;
   a plurality of unmanned, receive-only receptor terminals positioned at selected locations on or near the earth's surface to receive data signals from the satellite;
   a processing and control center for processing data collected by the satellite and for transmitting control signals to the satellite; and
   a wideband network connecting the receptor terminals and the processing and control center, wherein each of the receptor terminals is located in close proximity to a point of access to the wideband network;
   wherein the receptor terminals are positioned to provide near-global coverage of the earth, and data signals received at the receptor terminals are forwarded to the processing and control center over the wideband network with minimal delay and on a substantially continuous basis.

25. A satellite data collection and distribution system as defined in claim 24, wherein the satellite further comprises:
   means for storing a copy of a global coverage map maintained by the processing and control center, the coverage map indicating the positions of the receptor terminals; and
   means for retransmitting data that could not be successfully transmitted because of a gap in global coverage, as determined from the coverage map.

26. A satellite data collection and distribution system as defined in claim 25, wherein the means for retransmitting data comprises:
   means for retrieving from memory the data to be retransmitted;
   a multiplexer for coupling the retrieved data to the transmitter, interleaved with the collected data being broadcast on a substantially continuous basis; and
   means for timing the retransmission of the retrieved data to ensure reception by at least one of the receptor terminals, based on the coverage map.

27. A satellite data collection and distribution system as defined in claim 25, wherein the satellite further comprises:
   means for retransmitting data on receipt of a command from the processing and control center, wherein data received at the processing and control center with detected errors can be retransmitted from the satellite.

28. A satellite data collection and distribution system as defined in claim 24, wherein:
   the processing and control center includes means for maintaining a global coverage map defining the coverage provided by the receptor terminals and means for maintaining a copy of the coverage map on the satellite;
   wherein the coverage map is automatically adjusted to accommodate both newly added and inoperative receptor terminals, and wherein the satellite uses the coverage map to anticipate coverage gaps and take appropriate action to retransmit data that would otherwise be lost.

29. A satellite data collection and distribution system as defined in claim 28, wherein the at least one satellite is a plurality of similarly equipped satellites.

30. A method for collecting and distributing terrestrial data, the method comprising the steps of:
   collecting data from at least one sensor in at least one earth-orbiting satellite;
   broadcasting the collected data on a substantially continuous basis;
   simultaneously with the broadcasting step, storing the collected data in a memory on the satellite;
   receiving the broadcast data in a succession of unmanned, receive-only receptors positioned at selected locations on or near the earth's surface;
   forwarding the received data through a wideband network connecting the receptor terminals to a processing and control center, wherein each of the receptor terminals is located in close proximity to a point of access to the wideband network; and
   processing the data in the processing and control center;
   and wherein the receptor terminals are positioned to provide near-global coverage of the earth, and data signals received at the receptor terminals are forwarded to the processing and control center over the wideband network with minimal delay and on a substantially continuous basis.

31. A method as defined in claim 30, and further comprising:

storing on the satellite a copy of a global coverage map maintained by the processing and control center, the coverage map indicating the positions of the receptor terminals; and retransmitting stored data that could not be successfully transmitted because of a gap in global coverage, as determined from the coverage map.

32. A method as defined in claim 31, wherein the retransmitting step comprises:

retrieving from memory the data to be retransmitted;

multiplexing the received data with currently collected data, for broadcast from the satellite on a substantially continuous basis; and timing the retransmission of the retrieved data to ensure reception by at least one of the receptor terminals, based on the coverage map.

33. A method as defined in claim 31, and further comprising:

retransmitting stored data on receipt of a command from the processing and control center, wherein data received at the processing and control center with detected errors can be retransmitted from the satellite.

34. A method as defined in claim 30, and further comprising:

maintaining in the processing and control center a global coverage map defining the coverage provided by the receptor terminals;

maintaining a copy of the coverage map on the satellite, wherein the maintaining steps include making automatically adjustments to accommodate both newly added and inoperative receptor terminals; and anticipating, on the satellite, coverage gaps indicated by the coverage map and retransmitting data that would otherwise be lost if transmitted in a coverage gap.

35. A method as defined in claim 30, wherein the processing step comprises:

checking for data errors in data received from each receptor;

when one or more errors are detected in data received from a receptor, requesting and receiving retransmission of data from the receptor; and attempting to correct the one or more detected data errors using the retransmitted data.

36. A method as defined in claim 35, and further comprising:

if the one or more detected errors cannot be corrected using the retransmitted data, requesting and receiving retransmission of data from a receptor providing overlapping coverage of the data containing errors; and attempting to correct the one or more detected errors using data retransmitted by the receptor providing overlapping coverage.

37. A method as defined in claim 36, and further comprising:

if the one or more detected errors cannot be corrected using data retransmitted by the receptor providing overlapping coverage, requesting the satellite to mark the data as unread and to retransmit the data at its next opportunity;

retransmitting the data from the satellite; and forwarding the data retransmitted from the satellite, for correction of the one or more errors at the processing and control center.

* * * * *